United States Patent
Jeon et al.

(10) Patent No.: US 9,656,562 B2
(45) Date of Patent: May 23, 2017

(54) FEED APPARATUS, CURRENT COLLECTOR, AND POWER TRANSFER APPARATUS OF THE MAGNETIC INDUCTION TYPE, CONSIDERING LATERAL DEVIATION

(75) Inventors: Seong Jeub Jeon, Busan (KR); Bo Yune Song, Seoul (KR); Jae Gue Shin, Daejeon (KR); Sung Jun Son, Jeonju (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 754 days.

(21) Appl. No.: 14/113,724

(22) PCT Filed: Apr. 25, 2012

(86) PCT No.: PCT/KR2012/003181
§ 371 (c)(1),
(2), (4) Date: Apr. 14, 2014

(87) PCT Pub. No.: WO2012/148164
PCT Pub. Date: Nov. 1, 2012

(65) Prior Publication Data
US 2014/0217830 A1    Aug. 7, 2014

(30) Foreign Application Priority Data
Apr. 26, 2011 (KR) .......... 10-2011-0039206

(51) Int. Cl.
*H01F 27/42* (2006.01)
*H01F 37/00* (2006.01)
(Continued)

(52) U.S. Cl.
CPC ............. *B60L 11/182* (2013.01); *B60L 5/005* (2013.01); *B60L 11/1829* (2013.01);
(Continued)

(58) Field of Classification Search
CPC ................. B60L 11/182; H02J 50/10
(Continued)

(56) References Cited

U.S. PATENT DOCUMENTS

| 6,089,362 A * | 7/2000 | Takasan .................. B60L 5/005 191/10 |
| 2012/0186927 A1 * | 7/2012 | Suh ..................... B60L 11/1803 191/10 |

FOREIGN PATENT DOCUMENTS

| JP | 2003-143711 A | 5/2003 |
| JP | 2008-120239 A | 5/2008 |

(Continued)

OTHER PUBLICATIONS

International Search Report for International Application No. PCT/KR2012/003181, dated Jul. 4, 2012.

*Primary Examiner* — Carlos Amaya
(74) *Attorney, Agent, or Firm* — Lex IP Meister, PLLC (57) ABSTRACT

An embodiment of the present invention relates to a feed apparatus, a current collector, and a power transfer apparatus of the magnetic induction type, considering lateral deviation. An embodiment of the present invention relates to a power transfer apparatus comprising a feed apparatus and a current collector wherein the feed apparatus includes: a feed main unit having a predetermined width and length; a feed core forming a feed projection unit projected in the same direction and being perpendicular to both the width direction and the length direction at the left end and the right end of the width direction, with respect to a cutting side of the feed main unit in the width direction; and a pair of feed lines coiled respectively at the left end and the right end of the feed main unit in a length direction of the feed core adjacent to the feed projection unit, and the current collector includes: a current collection main unit having a predetermined width and length; a current collection core having a current col- (Continued)

lection projection unit projected in the same direction and being perpendicular to both the width direction and the length direction at a left end and a right end of a width direction, with respect to a cutting side of the current collection main unit in the width direction, and equipped with an extension unit extended toward each width direction in the current collection projection unit; and a current collection line coiled respectively at the left side and the right side of the current collection projection unit of the current collection core.

19 Claims, 12 Drawing Sheets

(51) Int. Cl.
*H01F 38/00* (2006.01)
*B60L 11/18* (2006.01)
*H02J 5/00* (2016.01)
*B60L 5/00* (2006.01)
*B60M 7/00* (2006.01)
*H01F 38/14* (2006.01)
*H02J 50/12* (2016.01)
*H02J 7/02* (2016.01)

(52) U.S. Cl.
CPC ....... *B60L 11/1831* (2013.01); *B60L 11/1833* (2013.01); *B60M 7/003* (2013.01); *H01F 38/14* (2013.01); *H02J 5/005* (2013.01); *H02J 50/12* (2016.02); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC .................................................. 307/9.1, 104
See application file for complete search history.

(56) References Cited

FOREIGN PATENT DOCUMENTS

KR   10-2005-0106313 A   11/2005
KR       10-0944113 B1    2/2010

* cited by examiner

Fig. 3b (E-shaped type)

(U-shaped type)

FEED APPARATUS, CURRENT COLLECTOR, AND POWER TRANSFER APPARATUS OF THE MAGNETIC INDUCTION TYPE, CONSIDERING LATERAL DEVIATION

RELATED APPLICATIONS

This application is a national stage filing under 35 U.S.C. §371 of International Application No. PCT/KR2012/003181, filed Apr. 25, 2012, which claims the benefit of Korean Patent Application No. 10-2011-0039206 filed on Apr. 26, 2011, each of which is incorporated herein by reference in its entirety.

TECHNICAL FIELD

An embodiment of the present invention relates to a feed apparatus, a current collector, and a power transfer apparatus of the magnetic induction type, considering lateral deviation. More particularly, the present invention relates to a feed apparatus, a current collector, and a power transfer apparatus of magnetic induction type, considering lateral deviation so that even if a moving body such as an electric vehicle is deviated from a feed line laid in the road by a certain distance to the left or the right, it can be effectively supplied with power necessary for operation.

DESCRIPTION OF RELATED ART

The matters described in this section are intended to simply provide background information for an embodiment of the present invention and do not constitute conventional technology.

Figure 1A:
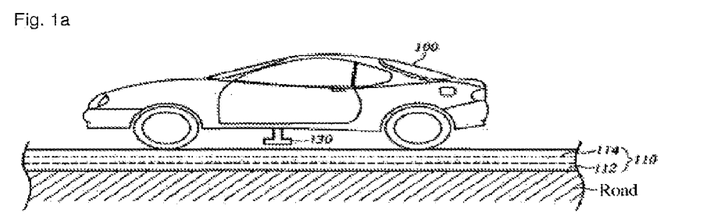
Figure 1B:
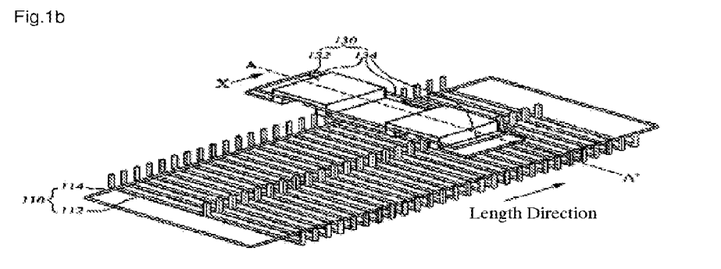

Drawing 1a shows an electric vehicle traveling on the road while being supplied with power from a feed line laid in the road and Drawing 1b simplifies only the feed core, the feed line and the current collector necessary for supplying power excluding the electric vehicle and the road from Drawing 1a.

As shown in Drawing 1a and Drawing 1b, when power of high frequency is supplied to the feed line (114) on the feed core (112), the electric vehicle (100) which is traveling on the road is supplied with power necessary for traveling according to the principle of electromagnetic induction acting between the feed apparatus (110) including the feed core (112) and the feed line (114) and the current collector (130).

Figure 1C:
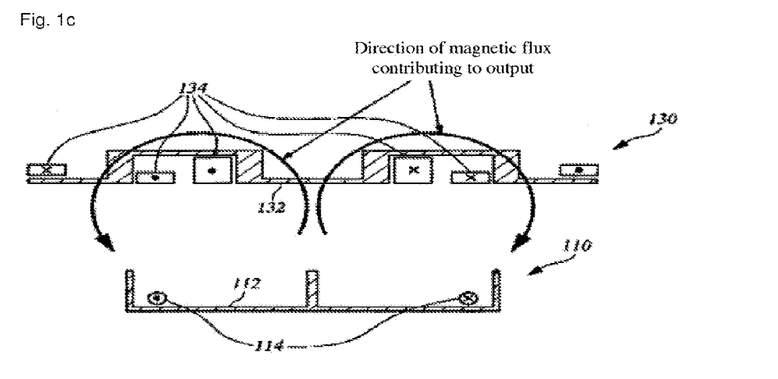

Drawing 1c shows a cross section cut along the line of A-A' in Drawing 1b and viewed in an X direction.

For Drawing 1c, a detailed illustration of drawing numbers for describing the look of a magnetic field is omitted and for drawing numbers indicated in the description of Drawing 1c, refer to Drawing 1b.

As shown in Drawing 1c, magnetic flux is generated from the feed line (114) in an arrow direction of semicircle and causes induced electromotive force to be generated in the current collection line (134).

Figure 2A:
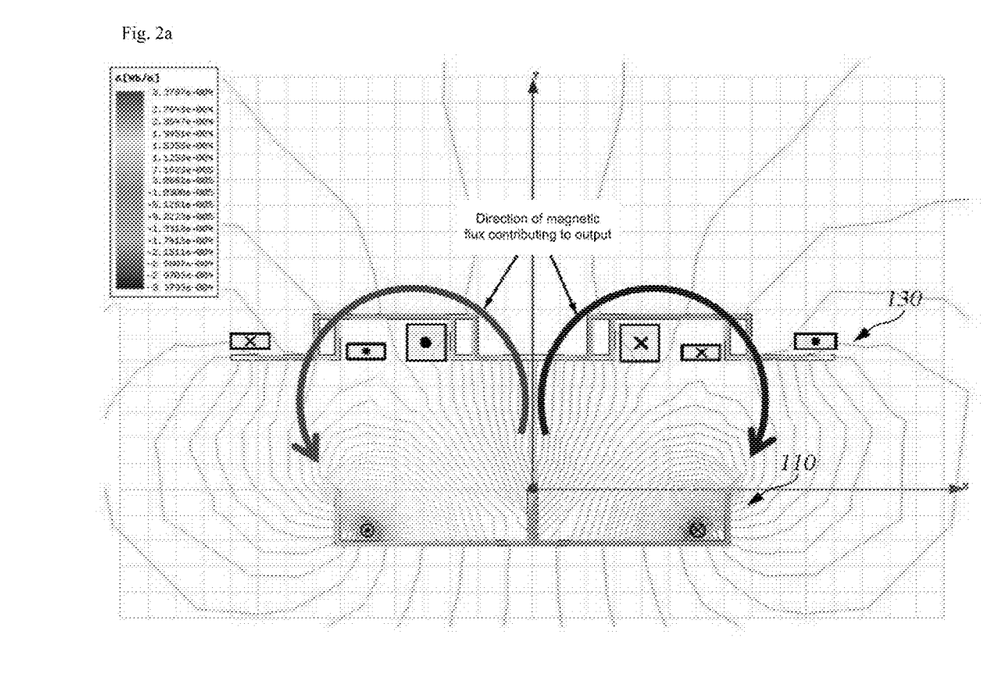
Figure 2B:
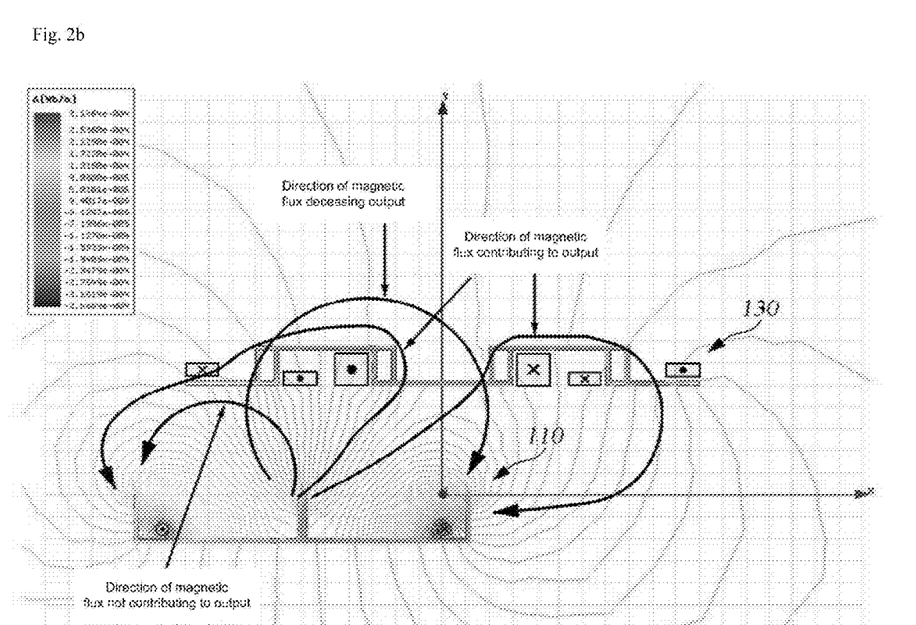

Drawing 2 illustrates the look of the magnetic field generated according to the positioning relationship between the feed core (112), the feed line (114) and the current collector (130) from Drawing 1c.

Drawing 2 (A) illustrates the arrangement of the feed core (112), the feed line (114), and the current collector (130) and the magnetic field generated when the electric vehicle (100) travels on the road so that the current collector (130) of the electric vehicle (100) would be positioned on the top of the center of the feed core (112) and the feed line (114) laid in the road to receive maximum power (that is, when the current collector (130) is positioned home) and Drawing 2 (B) illustrates the arrangement of the feed core (112), the feed line (114), and the current collector (130) and the magnetic field generated when the current collector (130) is positioned deviated from the center of the feed core (112) and the feed line (114) to the left or right by a certain distance (that is, when the current collector (130) is misaligned).

As shown in Drawing 2 (A), if the current collector (110) is positioned on the top of the center of the feed apparatus (110) while the electric vehicle (100) is traveling, the output of induced electromotive force can be generated at the current collection line (134) coiled at the current collection core (132) in a normal size. The arrow illustrated in a semicircle in Drawing 2 (A) gives a conceptual indication of the direction of a magnetic field contributing to the induced electromotive force of the current collector (130).

Meanwhile, Drawing 2 (B) has a problem that when the electric vehicle (100) travels so that the current collector (110) would be misaligned more than a certain distance, not only such magnetic flux as not contributing to induced electromotive force is increased but also such magnetic flux as being in the opposite direction to the direction contributing to induced electromotive force becomes high and power transfer from the feed apparatus (110) to the current collector (130) is not carried out smoothly.

DESCRIPTION OF THE INVENTION

Technical Task

In order to solve this problem, the first purpose of an embodiment of the present invention is to effectively supply power for operation to a moving body such as an electric vehicle while it is traveling on the road even if it is deviated from a feed line laid in the road by a certain distance to the left or the right.

The second purpose of an embodiment of the present invention is to greatly reduce the usage of a feed core and not to greatly lower the efficiency of power transfer by having a cutting part in the feed core.

Means to Solve the Task

In order to accomplish the abovementioned purposes, the first embodiment of the present invention provides a feed apparatus which include a feed main unit having a predetermined width and length, a U-shaped feed core forming a feed projection unit projected in the same direction and being perpendicular to both said width direction and said length direction at the left and the right end of said width direction, with respect to a cross section of said feed main unit in said width direction; and a pair of feed lines coiled respectively at the left and the right end of said feed main unit.

Said feed lines may be coiled adjacent to said feed projection unit.

Said feed lines may be coiled directly at said feed projection unit.

Said feed core may have multiple cutting parts in parallel to said width direction.

Said feed core may have regular intervals between each of said multiple cutting parts.

In order to accomplish the abovementioned purposes, the second embodiment of the present invention provides a feed apparatus which includes a feed main unit having a predetermined width and length, an E-shaped feed core forming a feed projection unit projected in the same direction and being perpendicular to both said width direction and said length direction at the left and the right end of said width direction, with respect to a cross section of said feed main unit perpendicular to said length direction and a central projection unit in the same direction as said feed projection unit in the center of said width direction; and a pair of feed lines coiled respectively at the left and the right end of said feed main unit.

Said feed lines may be coiled adjacent to or directly at said feed projection unit.

Said feed core has multiple cutting parts in parallel to said width direction and can be divided into multiple core pieces.

For said feed core, the thickness of said cutting part in said length direction may be larger than that of said core piece.

In order to accomplish the abovementioned purposes, the third embodiment of the present invention provides a feed apparatus which includes a feed main unit having a predetermined width and length, a U-shaped feed core forming a feed projection unit projected in the same direction and being perpendicular to both width direction and said length direction at the left and the right end of said width direction, with respect to a cross section of said feed main unit perpendicular to said length direction; and feed lines coiled in the length direction of said feed core at the center in the width direction of said feed main unit.

Said feed core may have multiple cutting parts in parallel to said width direction and be divided into multiple core pieces.

For said feed core, the thickness of said cutting part in said length direction may be similar to that of said core piece.

For said feed core, the intervals between cutting parts may be regular.

In order to accomplish the abovementioned purposes, the fourth embodiment of the present invention provides a current collector which includes a current collection main unit having a predetermined width and length, a ∩-shaped current collection core forming a current collection projection unit projected in the same direction and being perpendicular to both said width direction and said length direction at the left and the right end of said width direction, with respect to a cross section of said current collection main unit perpendicular to said length direction; and a current collector including current collection lines coiled at said current collection core.

Said current collection lines may be coiled respectively at the current collection projection unit projected at said left end and said right end.

Said current collection core may have extending parts extended in said width direction respectively at the ends of the current collection projection unit projected at said left end and said right end.

Said current collector may be installed in the lower part of a vehicle.

In order to accomplish the abovementioned purposes, the fifth embodiment of the present invention provides a power transfer apparatus which includes a feed apparatus as provided in one claim among claim 1 through claim 13 and a current collector as provided in one claim among claim 14 through claim 17, provided that said feed projection unit and said current collection projection unit are projected in the opposite direction to each other.

Effect of the Invention

According to an embodiment of the present invention, it has an effect of effectively supplying power necessary for operation to a moving body such as an electric vehicle charging while traveling on the road, even if it is deviated from a feed line laid in the road to the left or the right by a certain distance.

It also has an effect of greatly reducing the usage of a feed core while not greatly lowering the efficiency of power transfer by having cutting parts in the feed core.

BRIEF DESCRIPTION OF THE SEVERAL VIEW OF THE DRAWING

Drawing 1a shows an electric vehicle traveling on the road while being supplied with power from a feed line laid in the road Drawing 1b simplifies only the feed core, the feed line and the current collector necessary for supplying power excluding the electric vehicle and the road from Drawing 1a.

Drawing 1c shows a cross section cut along the line of A-A' in Drawing 1b and viewed in an X direction.

Drawing 2a-2b illustrates the magnetic field generated according to the positioning relationship between the feed core (112), the feed line (114) and the current collector (130) from Drawing 1c.

Drawing 3a shows a power transfer apparatus according to the first embodiment of the present invention.

Drawing 3b shows a U-shaped assembled feed core without cutting part and an E-shaped assembled feed core without cutting part.

Drawing 4 shows a cross section cut along the line of A-A' in Drawing 3a and viewed in an X direction.

Drawing 5a-5b illustrates the magnetic field generated in the power transfer apparatus shown in Drawing 3a and Drawing 4.

Drawing 6 illustrates a power transfer apparatus according to the second embodiment of the present invention.

Drawing 7 illustrates a cross section cut along the line of A-A' in Drawing 6 and viewed in an X direction.

Drawing 8a-8b illustrate the magnetic field generated in the power transfer apparatus of Drawing 6 and Drawing 7.

THE BEST FORM FOR AN EMBODIMENT OF THE INVENTION

From now on, a desired embodiment of the present invention will be explained in detail on reference to the attached drawings. Note that the same components in the drawings are indicated by the same reference numbers and symbols as much as possible, although they are shown in different drawings. If a detailed explanation of related function or configuration is considered to unnecessarily obscure the gist of the present invention, such a detailed explanation will be omitted.

In addition, such terms as 'the first', 'the second', 'A', 'B', '(a)', and '(b)' may be used in explaining the components of the present invention. These terms are simply intended to distinguish the corresponding component from others but do not limit the nature, sequence or order of the corresponding component. When it is described that one component is "connected", "combined", or "accessed" to another component, it should be understood that the former can be directly connected or accessed to the latter but the third component may be "connected", "combined", or "accessed" between each of the components.

Figure 3A:
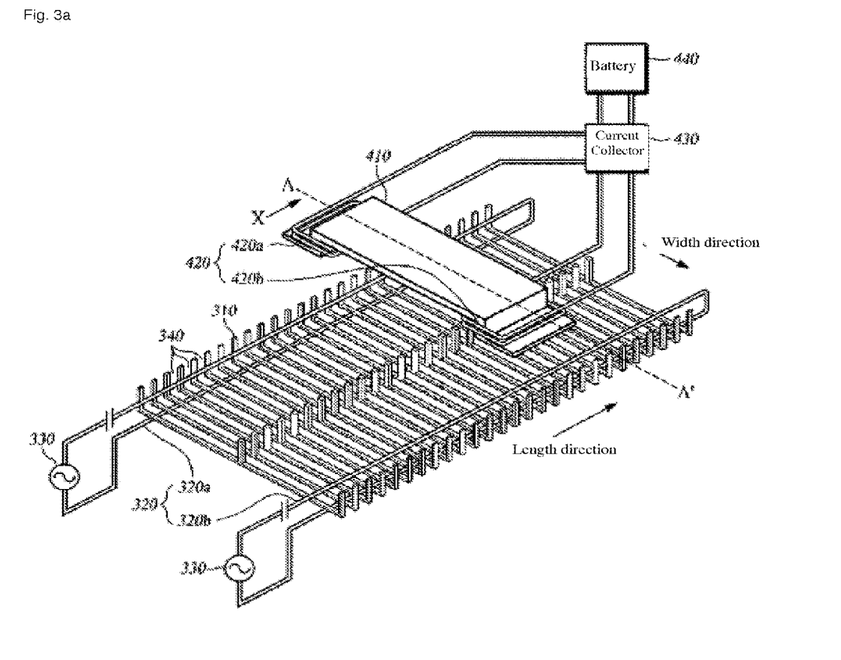
Figure 3B:
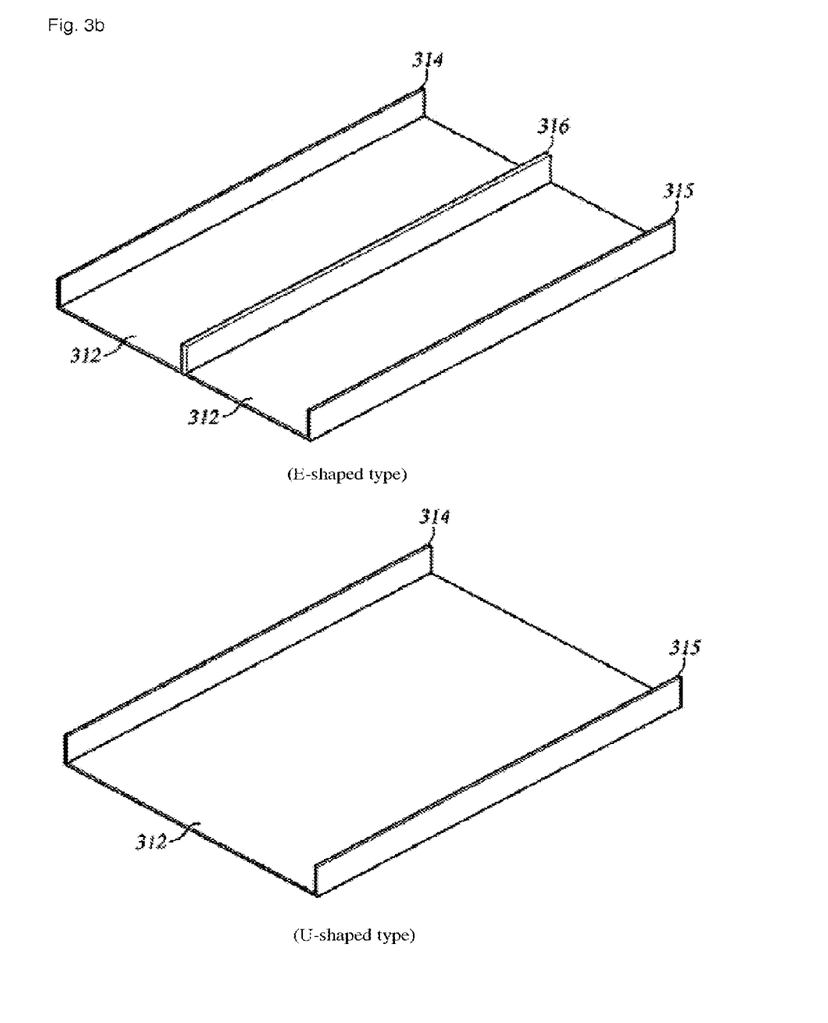
Figure 4:
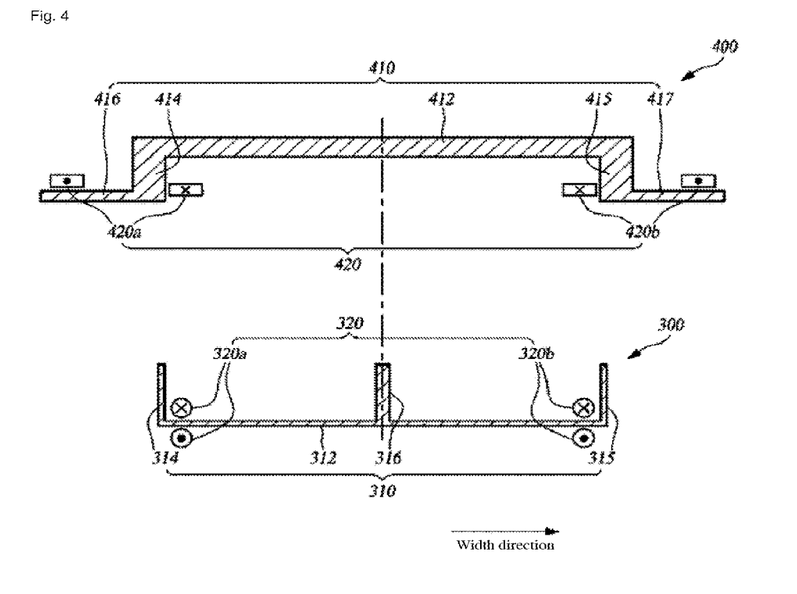

Drawing 3a illustrates a power transfer apparatus according to the first embodiment of the present invention and Drawing 4 illustrate a cross section cut along the line of A-A' in Drawing 3a and viewed in an X direction. Meanwhile, Drawing 3b illustrates a U-shaped assembled feed core without cutting part and an E-shaped assembled feed core without cutting part.

From now on, a power transfer apparatus according to the first embodiment of the present invention is explained on reference to Drawing 3a, Drawing 3b and Drawing 4.

As illustrated in Drawing 3a and Drawing 4, a power transfer apparatus according to the first embodiment of the present invention includes a feed apparatus (300) and a current collector (400).

The feed apparatus (300) according to the first embodiment of the present invention may consist of a feed core (310), a feed line (320), and an input power source (330) and the current collector (400) according to the first embodiment of the present invention may consist of a current collection core (410), a current collection line (420), a current collection circuit (430), and a battery (440).

The feed core (310) includes a feed main unit (312) having a predetermined width and length and a feed projection unit (314, 315) in which the cross section of the feed main unit (312) cut perpendicular to the length direction of the feed core (310) is projected to the left end and the right end in the width direction of the feed core (310). The feed projection unit (314, 315) is perpendicular to both the width direction and the length direction of the feed core (310), forming the feed core (310) in a U-shape. The feed core (310) has the feed projection unit (314, 315) so that a magnetic field can be easily transferred to the current collector (400).

Depending upon the applicable embodiment, the feed core (310) may include a central projection unit (316) projected in the same direction as the feed projection unit (314, 315) in an intermediate portion in the width direction of the feed main unit (312). This makes the feed core (310) shaped in such a form as an E-shape lying on its side and transfers more magnetic field to the current collector (400) than a U-shaped feed core.

A pair of feed lines (320) is coiled respectively at the left end and the right end of the feed main unit (312).

The left feed line (320a) is coiled at the left end of the feed main unit (312) in the length direction of the feed core (310) adjacent to the left feed projection unit (314) and the right feed line (320b) is coiled at the right end of the feed main unit (312) in the length direction of the feed core (310) adjacent to the right feed projection unit (315). In some cases, a pair of feed lines (320a, 320b) may be coiled respectively at the left and the right feed projection unit (314, 315).

The feed core (310) may be configured in an assembled type, as shown in Drawing 3b, or have a cutting part (340), as shown in Drawing 3a.

The feed core (310) may have multiple cutting parts (340) parallel to the width direction of the feed core (310). Thus, the feed core (310) may be divided into multiple core pieces in an E-shape (or U-shape).

In this case, as shown in Drawing 3a, the intervals between adjacent cutting parts (340) may be regular and the thickness of the cutting part (340) may be larger than, similar with, or smaller than that of the core piece in an E-shape (or U-shape).

As shown in Drawing 3a, by forming the cutting part (340) in the feed core (310), when the feed core with the capacity half of that of an assembled feed core as shown in Drawing 3b, the output is reduced by about 10% of that being induced to the current collector (400), compared to the case of Drawing 3a. However, the capacity of the ferrite core used in the feed core (310) can be reduced half and the reduction of the output induced to the current collector (400) is not large, indicating high economic feasibility.

Meanwhile, the current collection core (410) includes a current collection main unit (412) having a predetermined width and length and a current collection projection unit (414, 415) projected in the same direction and being perpendicular to both the width direction and the length direction of the current collection core at the left and the right end of the width direction of the current collection core (410), so that a cross section of the current collection main unit (412) in the width direction would be in a ∩-shape. In this case, the current collection projection unit (414, 415) is projected in the opposite direction to the feed projection unit (314, 315).

In addition, the end of the current collection projection unit (414, 415) may have an extension (416, 417) extended in the width direction of the current collection core (410). By having the extension (416, 417) at the end of the current collection projection unit (414, 415), the current collection projection unit (414, 415) have an effect of increasing an effective cross-sectional area on a magnetic path and reducing magnetic resistance.

Meanwhile, the extension may be formed turning out from the current collection projection unit (414, 415) with the center of the feed main unit (412), as indicated by reference numbers of 416 and 417, or have an additional projection towards the center of the current collection main unit (412) in the width direction of the current collection core (410) (that is, in the opposite direction to those indicated by reference numbers of 416 and 417 based on the current collection projection unit (414, 415)).

A pair of the current collection lines (420) may be coiled respectively at the left current collection projection unit (414) and the right current collection projection unit (415) of the current collection core (410), and in some cases, it may be coiled at the feed main unit (412).

When an input power source (330) is applied to the feed lines (320) of Drawing 3a, a magnetic field is generated from the feed lines (320), bringing about an induced electromotive force is generated from the current collection lines (420). The current collection lines (420a, 420b) coiled respectively at the left and the right current collection projection units (414, 415) of the current collection core (410) are connected respectively to the current collection circuit (430) in parallel to generate the voltage of desired level and charge the battery (440). Or, two current collection lines (420a, 420b) are connected to the current collection circuit (430) in series to charge the battery (440). Note that the current collection circuit (430) may include a rectifier and a regulator.

Drawing 5 illustrates the magnetic field generated in the power transfer apparatus shown in Drawing 3a and Drawing 4. Indication of reference number is omitted to illustrate the magnetic field in Drawing 5 and the reference numbers of Drawing 4 are referred in the description of Drawing 5.

Figure 5A:
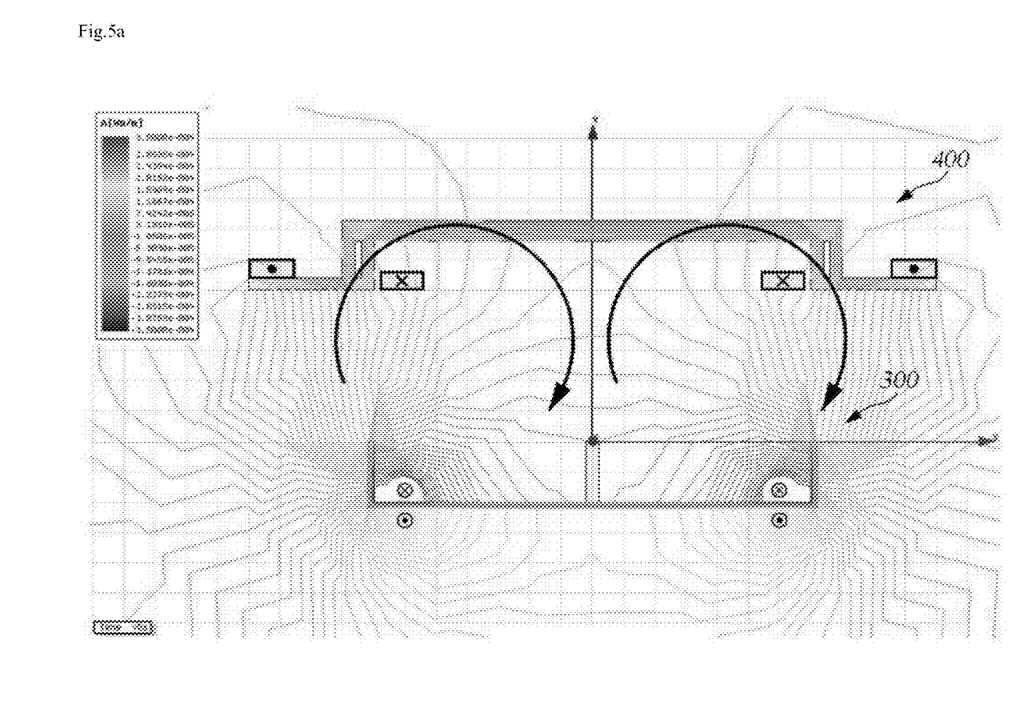
Figure 5B:
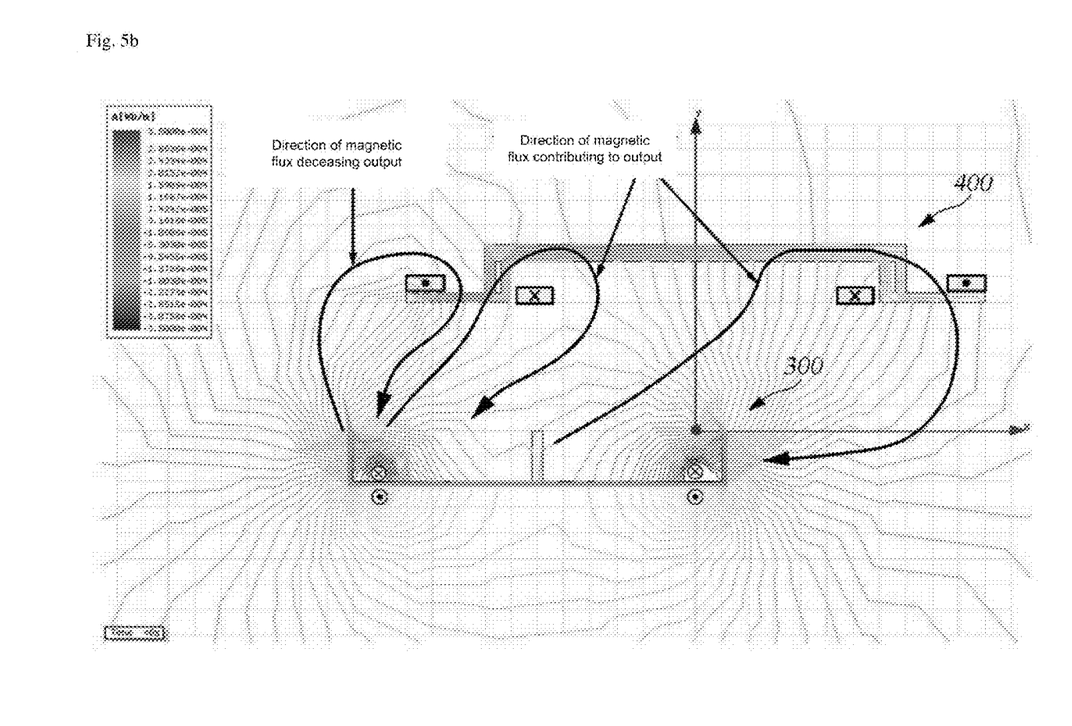

Drawing 5 (A) illustrates the magnetic field generated when the current collector (400) is positioned home so that the maximum power would be transferred to the current collector (400) and Drawing 5 (B) illustrates the magnetic field generated when the current collector (400) is misaligned.

When the current collector (400) is positioned home as shown in Drawing 5 (A), the output of induced electromotive force can be generated at the current collection lines (420) coiled at the current collection core (410) in a normal magnitude. The arrow illustrated in a semicircle in Drawing 5 (A) gives a conceptual indication of the direction of a magnetic field contributing to the induced electromotive force of the current collector (400).

When the current collector (400) is misaligned as shown in Drawing 5 (B), the magnetic flux not contributing to induced electromotive force becomes high but the magnetic flux in the opposite direction to that of contributing to induced electromotive force is not high.

Meanwhile, in a power transfer apparatus looking like that of Drawing 2, if the sum of the voltage generated from the current collection line is 1651V as a result of simulation of the output collected in the current collection line (134) in such conditions that the feed core (110) is 72 cm in width and the current collector (130) is 110 cm in width and positioned home as shown in Drawing 2 (A), the sum of the voltage generated from the current collection line (134) is 148V with the current collector (130) misaligned by 30 cm, as shown in Drawing 2 (B), indicating that the voltage generated is reduced much. Because when the voltage induced to the current collector (130) decreases, the induced current also decreases, it can be known that the output induced to the current collector (130) sharply decreases.

However, in a power transfer apparatus looking like that of Drawing 5, if the sum of the voltage generated from the current collection line (420) is 1726V as a result of simulation of the voltage collected in the current collector (400) in such conditions that the feed core (310) is 72 cm wide and the current collector (400) is 110 cm wide and positioned home as shown in Drawing 5 (A), the sum of the voltage generated from the current collection line (420) is 1559V with the current collector (400) misaligned by 30 cm with the same condition as shown in Drawing 2 (B), indicating the voltage generated is not reduced much and it is more effective than that of Drawing 2 (B).

Figure 6:
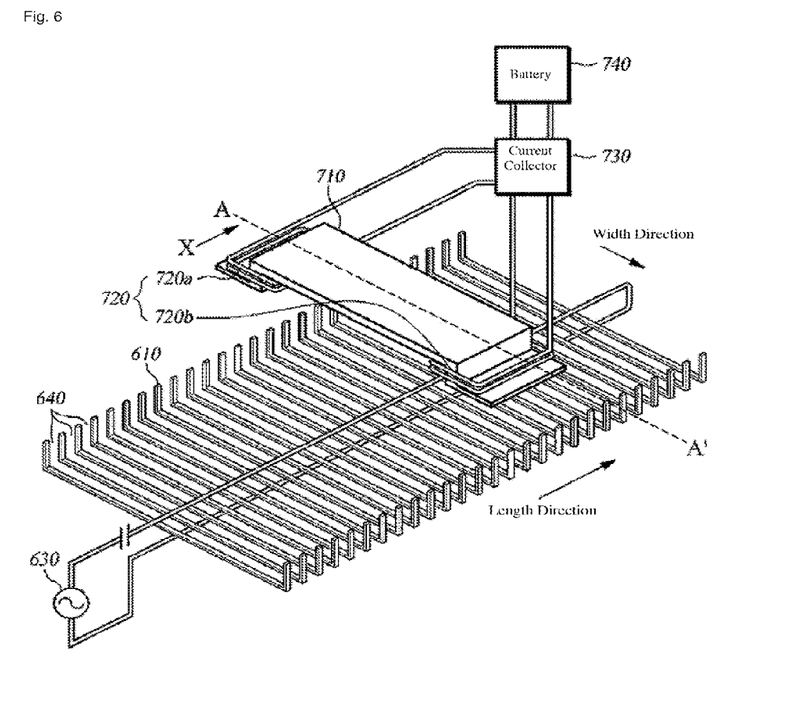
Figure 7:
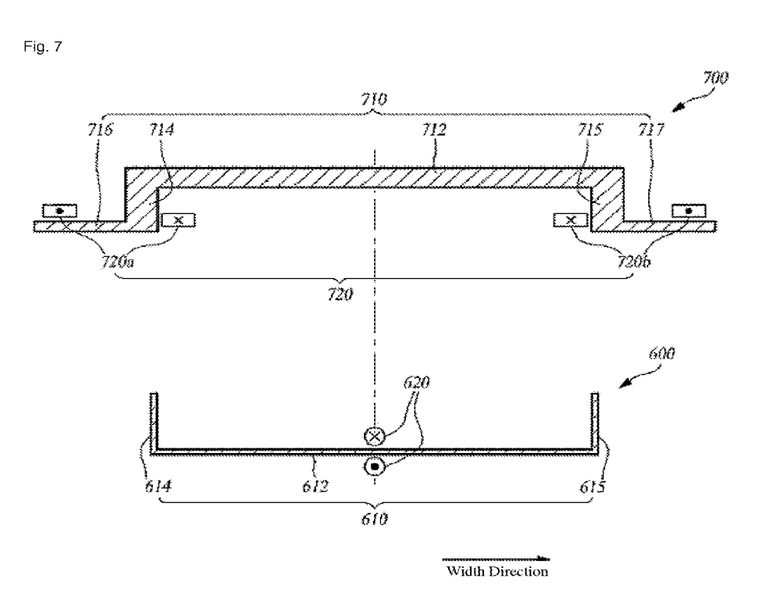

Drawing 6 illustrates a power transfer apparatus according to the second embodiment of the present invention, and Drawing 7 illustrates a cross section cut along the line of A-A' in Drawing 6 and viewed in an X direction.

As shown in Drawing 6 and Drawing 7, the second embodiment of the present invention includes a feed apparatus (600) and a current collector (700).

The appearance of a feed core (610) shown in Drawing 6 and Drawing 7 is similar to that of the feed core (300) shown in Drawing 3a and Drawing 4, so a detailed explanation for the feed core (610) is omitted.

A feed line (620) is coiled at the central part in the width direction of a feed main unit (612) in the length direction of the feed core (610).

When an input power source (630) is applied to the feed line (620) of Drawing 6, a magnetic field is generated from a feed line (720). Current collection lines (720a, 720b) coiled respectively at the left and the right current collection projection units (714, 715) of a current collection core (710) are connected respectively to a current collection circuit (730) in parallel to generate the voltage of desired level and charge a battery (740). Because the form and function of the feed apparatus (600) are similar to those of the current collector (400), more detailed explanation is omitted.

Drawing 8 illustrates the magnetic field generated in the power transfer apparatus shown in Drawing 6 and Drawing 7. Indication of reference number is omitted to illustrate the magnetic field in Drawing 8 and the reference number of Drawing 7 are referred in the description of Drawing 8.

Figure 8A:
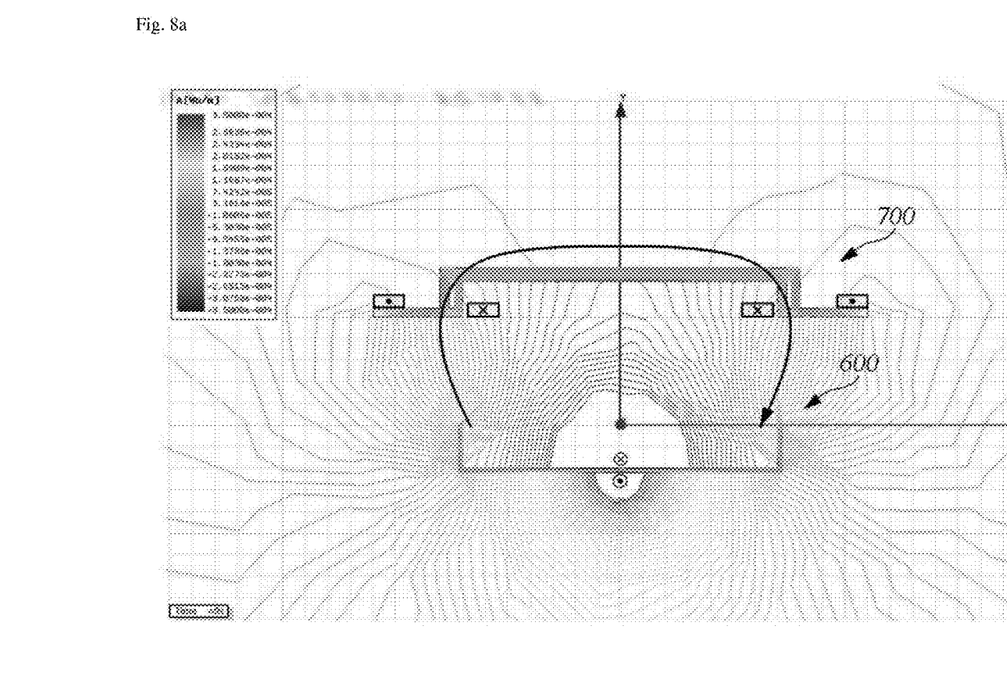
Figure 8B:
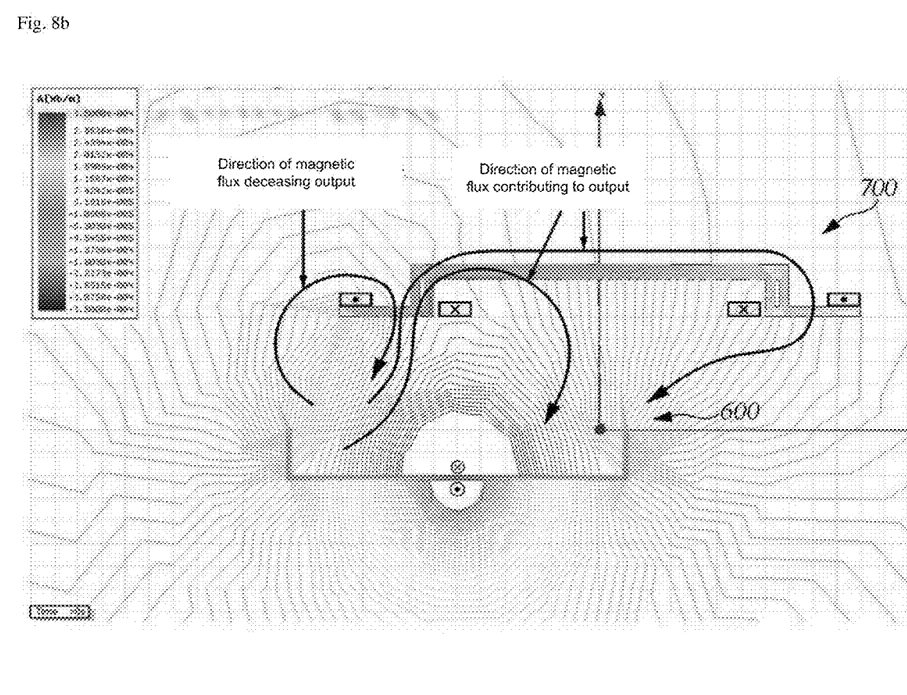

Drawing 8 (A) illustrates the magnetic field generated when the central part in the width direction of the current collector (700) is positioned on the top of the central part in the width direction of the feed apparatus (600) (that is, when the current collector (700) is positioned home) so that the maximum power would be transferred to the current collector (700) and Drawing 8 (B) illustrates the magnetic field generated when the current collector (700) is misaligned.

When the current collector (700) is positioned home as shown in Drawing 8 (A), the output of induced electromotive force can be generated at the current collection lines (720) coiled at the current collection core (710) in a normal magnitude. The arrow illustrated in a semicircle in Drawing 8 (A) gives a conceptual indication of the direction of a magnetic field contributing to the induced electromotive force of the current collector (700).

Meanwhile, when the current collector (700) is misaligned by a certain distance as shown in Drawing 8 (B), the magnetic flux not contributing to induced electromotive force becomes high but the magnetic flux in the opposite direction to that of contributing to induced electromotive force is smaller than when the current collector (700) is positioned home and the reduction in voltage of the current collector (130) is less than when the current collector (130) is misaligned by a certain distance in Drawing 2.

For example, in a power transfer apparatus looking like that of Drawing 8, if the voltage generated from the current collector (700) is 2782 V in such conditions that the feed core (610) is 72 cm wide and the current collector (700) is 110 cm wide with the same conditions as Drawing 5 and the current collector (700) is positioned home as shown in Drawing 8 (A), the voltage generated from the current collector (700) which is misaligned by 30 cm as shown in Drawing 8 (B) is 1870V, indicating the voltage generated is not reduced much and it is more effective than that of Drawing 2 (B).

Table 1 shows the comparison of the output of induced electromotive force between the current collector (700) positioned home and misaligned by 30 cm in Drawings 2, 5, and 8.

TABLE 1

|  | Output voltage at home position | Output voltage at misalignment by 30 cm | Maintenance ratio of misalignment to home position |
| --- | --- | --- | --- |
| Drawing 2 | 1651 V | 148 V | 9.0% |
| Drawing 5 | 2063 V | 1559 V | 75.9% |
| Drawing 8 | 2782 V | 1870 V | 67.2% |

As indicated in Table 1, in Drawing 2, the maintenance ratio of a 30 cm-misalignment to home position is only 9.0% and indicates that it is hard to effectively generate induced electromotive force to the current collector. In Drawings 5 and 8, however, the ratio is 75.9% and 67.2%, respectively, indicating that even though the current collector is misaligned by a certain distance, a considerable amount of induced electromotive force can be generated in the current collector.

The present invention is not necessarily limited to the abovementioned embodiments, although all of the components of the embodiments of the present invention are combined or operated in an assembly. That is, one or more of such components may be combined selectively to operate within the range of the purpose of the present invention.

In addition, because the terms of "include", "consist of", or "have" stated above mean that unless otherwise specified, the applicable components can be included, they should be construed as including other components, not as excluding them. All the terminology including technical or scientific terms, unless otherwise defined, have the same meanings as being generally understood by those who have common knowledge in the related art of the present invention. Terms in general use, like those defined in a dictionary, should be construed as coinciding with the meaning of the context of related art and unless obviously defined in the present invention, should not construed as having excessively formal meanings.

The abovementioned discussion is merely an adumbrative explanation of the technical philosophy of the present invention and anyone who has common knowledge of the related art of the present invention may alter or change in various ways within the range not deviated from the intrinsic nature of the present invention. Therefore, the embodiments of the present invention are not to limit but to explain the technical philosophy of the present invention, and the range of the technical philosophy of the present invention is not limited by the embodiments. The protection range of the present invention should be construed under the scope of claims below, and the entire technical philosophy within the same range should be construed as being included in the scope of rights of the present invention.

AVAILABILITY IN THE RELATED INDUSTRY

As abovementioned, the present invention is a useful invention in that even if a moving body such as an electric vehicle which is charged while traveling on the road is deviated from a feed line laid in the road by a certain distance to the left or the right, it can be effectively supplied with power necessary for operation.

What is claimed is:

1. A feed apparatus comprising:
a feed core having a feed main unit having a predetermined width and length, and feed projection units projected in a same direction and being perpendicular to both said width direction and said length direction of said feed main unit at a left end and a right end of said feed main unit in said width direction; a first feed line coiled around said feed main unit at the left end side; and a second feed line coiled around said feed main unit at the right end side,
wherein a current of the first feed line and a current of the second feed line flow around said feed main unit in a same direction.

2. The feed apparatus of claim 1, wherein said feed lines are coiled adjacent to said feed projection units.

3. The feed apparatus of claim 1, wherein said feed lines are coiled at said feed projection units.

4. The feed apparatus of claim 1, wherein said feed core has multiple cutting parts in parallel to said width direction.

5. The feed apparatus of claim 4, wherein said feed core has regular intervals between each of said multiple cutting parts.

6. A feed apparatus comprising:
an E-shaped feed core having a feed main unit having a predetermined width and length, feed projection units projected in a same direction and being perpendicular to both said width direction and said length direction of said feed main unit at a left end and a right end of said feed main unit in said width direction, and a central projection unit projected in the same direction as said feed projection units at a center of said feed main unit in said width direction; a first feed line coiled around said feed main unit at the left end side; and a second feed line coiled around said feed main unit at the right end side,
wherein a current of the first feed line and a current of the second feed line flow around said feed main unit in a same direction.

7. The feed apparatus of claim 6, wherein said feed lines are coiled adjacent to said feed projection unit or coiled directly at said feed projection units.

8. The feed apparatus of claim 6, wherein said feed core has multiple cutting parts in parallel to said width direction and is divided into multiple core pieces.

9. The feed apparatus of claim 8, wherein each of said cutting parts has a thickness in said length direction larger than a thickness of each said core pieces.

10. A feed apparatus comprising:
a U-shaped feed core having a feed main unit having a predetermined width and length, and feed projection units projected in a same direction and being perpendicular to both said width direction and said length direction of said feed main unit at a left end and a right end of said feed main unit in said width direction; and
a feed line coiled around a bottom portion of said feed main unit in the length direction at a center of said feed main unit in the width direction.

11. The feed apparatus of claim 10, wherein said feed core has multiple cutting parts in parallel to said width direction and be divided into multiple core pieces.

12. The feed apparatus of claim 11, wherein each of said cutting parts has a thickness in said length direction similar to a thickness of each said core pieces.

13. The feed apparatus of claim 12, wherein said feed core has regular intervals between each of the cutting parts.

14. A current collector comprising:
a ∩-shaped current collection core having a current collection main unit having a predetermined width and length, current collection projection units projected in a same direction and being perpendicular to both said width direction and said length direction of said current collection main unit at a left end and a right end of said current collection main unit in said width direction; and
a current collector including current collection lines coiled at said current collection core, wherein said current collection lines are respectively coiled at each of said current collection projection units, and a current of a first induced line and a current of a second induced line flow around said current collection main unit in a same direction.

15. The current collector of claim 14, wherein said current collection core has extending parts extended in said width direction respectively at ends of the current collection projection units projected at said left end and said right end said current collection main unit.

16. The current collector of claim 14, wherein said current collection apparatus is installed in a lower part of a vehicle.

17. A power transfer apparatus comprising:
a feed apparatus of claim 1; and
a current collector, the current collector which includes:
a ∩-shaped current collection core having a current collection main unit having a predetermined width and length, current collection projection units projected in a same direction and being perpendicular to both said width direction and said length direction of said current collection main unit at a left end and a right end of said current collection main unit in said width direction; and
a current collector including current collection lines coiled at said current collection core, wherein said current collection lines are respectively coiled at each of said current collection projection units, wherein said feed projection units and said current collection projection units are projected in the opposite direction to each other.

18. A power transfer apparatus comprising:

a feed apparatus of claim 6; and a current collector, the current collector which includes:

a ∩-shaped current collection core having a current collection main unit having a predetermined width and length, current collection projection units projected in a same direction and being perpendicular to both said width direction and said length direction of said current collection main unit at a left end and a right end of said current collection main unit in said width direction; and a current collector including current collection lines coiled at said current collection core, wherein said current collection lines are respectively coiled at each of said current collection projection units, wherein said feed projection units and said current collection projection units are projected in the opposite direction to each other.

19. A power transfer apparatus comprising:

a feed apparatus of claim 10; and a current collector, the current collector which includes:

a ∩-shaped current collection core having a current collection main unit having a predetermined width and length, current collection projection units projected in a same direction and being perpendicular to both said width direction and said length direction of said current collection main unit at a left end and a right end of said current collection main unit in said width direction; and a current collector including current collection lines coiled at said current collection core, wherein said current collection lines are respectively coiled at each of said current collection projection units, wherein said feed projection units and said current collection projection units are projected in the opposite direction to each other.

* * * * *